United States Patent [19]
Fee

[11] Patent Number: 5,731,887
[45] Date of Patent: Mar. 24, 1998

[54] SYSTEM AND METHOD FOR PHOTONIC FACILITY AND LINE PROTECTION SWITCHING

[75] Inventor: John A. Fee, Plano, Tex.

[73] Assignee: MCI Communications Corporation, Washington, D.C.

[21] Appl. No.: 577,663

[22] Filed: Dec. 22, 1995

[51] Int. Cl.$^6$ .................. H04B 10/08; H04B 10/12; H04J 14/00

[52] U.S. Cl. .................. 359/110; 359/117; 359/173; 370/225

[58] Field of Search .................. 359/110, 117–118, 359/128, 139, 173, 179; 370/225, 360, 380, 217, 228; 371/8.2; 385/16

[56] References Cited

U.S. PATENT DOCUMENTS

| | | | |
|---|---|---|---|
| 4,451,916 | 5/1984 | Casper et al. | 370/16 |
| 4,527,270 | 7/1985 | Sweeton | 371/11 |
| 4,542,502 | 9/1985 | Levinson et al. | 370/88 |
| 4,560,246 | 12/1985 | Cotter | 380/96.16 |
| 4,561,119 | 12/1985 | Epworth | 332/7.51 |
| 4,596,982 | 6/1986 | Bahr et al. | 340/825.05 |

(List continued on next page.)

FOREIGN PATENT DOCUMENTS

| | | |
|---|---|---|
| 0359352 A2 | 3/1990 | European Pat. Off. . |
| 0449475 A2 | 10/1991 | European Pat. Off. . |
| 0 620 694 A2 | 10/1994 | European Pat. Off. . |
| 0 721 275 A2 | 7/1996 | European Pat. Off. . |

OTHER PUBLICATIONS

Patent Abstracts of Japan, vol. 095, No. 001, Feb. 28, 1995, JP 06 291739 A, Oct. 18, 1994.

Patent Abstracts of Japan, vol. 12, No. 423, JP 63 160436 A, Jul. 4, 1988.

Hill et al., "A Transport Network Layer Based on Optical Network Elements," *Journal of Lightwave Technology*, vol. 11, No. 5/6, May/Jun. 1993, pp. 667–676.

(List continued on next page.)

Primary Examiner—Kinfe-Michael Negash
Attorney, Agent, or Firm—Sterne, Kessler, Goldstein & Fox P.L.L.C.

[57] ABSTRACT

A system and method for photonic facility and line protection switching in an optical network to permit fault tolerant operation. The optical network comprises components whose operation is monitored by a controller. If the controller determines a component in a signal path has failed, the controller will re-route the signal path through a spare, or protect, component.

10 Claims, 2 Drawing Sheets

U.S. PATENT DOCUMENTS

| | | | |
|---|---|---|---|
| 4,704,714 | 11/1987 | Tomizawa et al. | 370/15 |
| 4,745,597 | 5/1988 | Morgan et al. | 370/87 |
| 4,763,315 | 8/1988 | Nakayashiki et al. | 370/16 |
| 4,768,190 | 8/1988 | Giancarlo | 370/86 |
| 4,797,589 | 1/1989 | Collins | 370/63 |
| 4,821,255 | 4/1989 | Kobrinski . | |
| 4,831,662 | 5/1989 | Kuhn | 455/608 |
| 4,845,736 | 7/1989 | Posner et al. | 379/27 |
| 4,866,699 | 9/1989 | Brackett et al. | 370/3 |
| 4,887,256 | 12/1989 | Nakayashiki et al. | 370/16 |
| 4,956,835 | 9/1990 | Grover | 370/16 |
| 4,964,095 | 10/1990 | Tyrrell et al. | 370/55 |
| 5,058,105 | 10/1991 | Mansour et al. | 370/16 |
| 5,069,521 | 12/1991 | Hardwick | 359/110 |
| 5,081,452 | 1/1992 | Cozic | 340/825.5 |
| 5,091,902 | 2/1992 | Chopping et al. | 370/16.1 |
| 5,166,821 | 11/1992 | Huber | 359/238 |
| 5,179,548 | 1/1993 | Sandesara | 370/16.1 |
| 5,182,744 | 1/1993 | Askew et al. | 370/16 |
| 5,200,964 | 4/1993 | Huber | 372/26 |
| 5,218,465 | 6/1993 | Lebby et al. | 359/110 |
| 5,271,075 | 12/1993 | Gfeller et al. | 385/20 |
| 5,299,293 | 3/1994 | Mestdagh et al. | 359/110 |
| 5,327,427 | 7/1994 | Sandesara | 370/85.14 |
| 5,329,392 | 7/1994 | Cohen | 359/124 |
| 5,329,396 | 7/1994 | Fishman et al. | 359/173 |
| 5,329,520 | 7/1994 | Richardson | 370/16 |
| 5,333,130 | 7/1994 | Weismann et al. | 370/16 |
| 5,341,364 | 8/1994 | Marra et al. | 370/16.1 |
| 5,343,464 | 8/1994 | Iino et al. | 370/16 |
| 5,359,450 | 10/1994 | Ramachandran et al. | 359/188 |
| 5,365,510 | 11/1994 | Nicholson et al. | 370/16 |
| 5,373,383 | 12/1994 | LaGasse | 359/161 |
| 5,373,385 | 12/1994 | Darcie et al. | 359/162 |
| 5,396,357 | 3/1995 | Goossen et al. | 359/119 |
| 5,420,868 | 5/1995 | Chraplyvy et al. . | |
| 5,434,691 | 7/1995 | Yamane | 359/117 |
| 5,442,472 | 8/1995 | Skroblro | 359/110 |
| 5,446,725 | 8/1995 | Ishiwatari | 370/16.1 |
| 5,452,115 | 9/1995 | Tomioka | 359/123 |
| 5,457,555 | 10/1995 | Morigama | 359/117 |
| 5,457,556 | 10/1995 | Shiragaki | 359/139 |
| 5,459,715 | 10/1995 | Furuta et al. | 370/16 |
| 5,479,608 | 12/1995 | Richardson | 395/182.02 |
| 5,495,471 | 2/1996 | Chow et al. | 370/16 |
| 5,517,489 | 5/1996 | Ogura | 370/16.1 |
| 5,602,828 | 2/1997 | Engdahl et al. | 370/228 |

OTHER PUBLICATIONS

Aida et al., "Optical Protection Switches for Trunk Transmission Systems," *IEEE International Conference on Communications '88*, vol. 1, Jun., 1988, pp. 1.1.1–1.1.5.

Brooks et al., "An optical fibre supervisory sub–system employing an entirely optical telemetry path," *European Conference on Optical Communication*, Sep., 1982, pp. 400–405.

Elrefaie, "Multiwavelength Survivable Ring Network Architectures," *IEEE International Conference on Communications '93*, vol. 2, May, 1993, pp. 1245–1251.

Hadjifotiou et al., "Supervisory Options for Fibre Optical Amplifier Systems," *Fourth IEEE Conference on Telecommunication*, Conference Publication No. 371, Apr. 18, 1993, pp. 53–56.

Jensen et al., "Novel technique for monitoring long–haul undersea optical–amplifier systems," *Optical Fiber Communication*, vol. 4, Feb. 1994, pp. 256–257.

Matsuoka et al., "Supervisory Signal Transmission Methods for Optical Amplifier Repeater Systems," *IEEE*, 1990, pp. 1846–1850.

Murakami et al., "A Remote Supervisory System Based on Subcarrier Overmodulation for Submarine Optical Amplifier Systems," *IEEE: Journal of Lightwave Technology*, vol. 14, No. 5, May, 1996, pp. 671–677.

Wagner et al., "Multiwavelength Ring Networks for Switch Consolidation and Interconnection," *Supercomm/International Conference on Communications*, vol. 3, Jun., 1992, pp. 1173–1179.

Wehr, "Wavelength division multiplexing in transmission networks," *Commutation & Transmission*. No. 2, 1995, pp. 29–34.

Yamabayashi et al., "Supervisory Signal Transmission by Modulating the mBIC Code Complementary Bit," *IEEE: Journal of Lightwave Technology*, Vol. 9, No. 3, Mar., 1991, pp. 381–385.

Chao et al., "FASTAR—A Robust SYstem for Fast DS3 Restoration,"*Globecom '91*, 1991, pp. 1396–1400.

Zhou, Jianhui et al., "Four–Wave Mixing Wavelength Conversion Efficiency in Semiconductor Traveling–Wave Amplifiers Measured to 65 nm of Wavelength Shift," *IEEE Photonics Technology Letters*, vol. 6, No. 8, Aug. 1994, pp. 984–987.

Riaziat, M. L. et al., "Optical Wavelength Shifting by Traveling–Wave Electrooptic Modulation," *IEEE Photonics Technology Letters*, vol. 5, No. 9, Sep. 1993, pp. 1002–1005.

Park, E. et al., "Simultaneous All–Optical Packet–Header Replacement and Wavelength Shifting for a Dynamically-Reconfigurable WDM Network," *IEEE Photonics Technology Letters*, vol. 7, No. 7, Jul. 1995, pp. 810–812.

Bhagavathk, Vijay K., "Reliability Evaluation and Protection Schemes for Dense WDM Network Architectures," 92CH3132 I.E.E.E., pp. 0174–0178 (1992).

Brackett, C., "Dense Wavelength Division Multiplexing Networks: Principles & Applications," I.E.E.E. Journal on Selected Areas in Communications, vol. 8, No. 6, pp. 948–664 (Aug. 1990).

DeMeis, R., "Select the Right Test Equipment for Your Fiber Optic Needs," Laser Focus World, pp. 161–173 (Oct. 1995).

Green, P., Fiber Optic Networks, Prentice Hall, pp. 7–10 (1993).

Grover, Wayne Ph.D., "Distributed Restoration of the Transport Network," Network Management into the 21st Century, Chapter 11, IEEE Press, p. 337.

Hecht, Jeff., "Push is on for Multiwavelength Optical Networks," Laser Focus World, pp. 59–61 (Oct. 1995).

Minoli, D., "Telecommunications Technology Handbook," Artech House: Norwood, MA, chptrs. 3 and 7 (1995).

Spirit, D.M. et al., eds. High Capacity Optical Transmission Explained, John Wiley & Sons, West Sussex, England, chptrs. 1, 6 and 7 (1995).

Waynant et al., "Optical Integrated Circuits," Electro–Optics Handbook, (McGraw–Hill, Inc., U.S.A.), chpt. 26, pp. 26.1–26.39 (1994).

Wu, T., "Emerging Technologies for Fiber Network Survivability," IEEE Communications Magazine, pp. 58–74, (Feb. 1995).

Wu, T. et al., "Strategies and Technologies for Planning a Cost–Effective Survivable Fiber Network Architecture Using Optical Switches," CH2655–9 IEEE pp. 749–755, (1989).

Bhagavath, Vijay K. and Harold Sobol, "Reliability Evaluation and Protection Schemes for Dense WDM Network Architectures", *SUPERCOM/ICC '92: Discovering a New World of Communication*, 1992, pp. 307.2.1–307.2.5.

Brackett, Charles, "Dense Wavelength Division Multiplexing Networks: Principles and Applications", *IEEE Journal of Selected Areas in Communications*, vol. 8, No. 6, Aug. 1990, pp. 948–964.

Grover, Dr. Wayne, "Distributed Restoration of the Transport Network", *Network Managment into the 21st Century*, Chapter 11, pp. 337–417.

Wu, Tsong–Ho, "Emerging Technologies for Fiber Network Survivability", *IEEE Communications Magazine*, Feb. 1995, pp. 58–74.

Wu, Tsong–Ho and Sarry F. Habiby, "Strategies and Technologies for Planning a Cost–Effective Survivable Fiber Network Architecture Using Optical Switches", *IEEE International Conference on Communications*, 1989, pp. 23.6.1–23.6.7.

SYSTEM AND METHOD FOR PHOTONIC FACILITY AND LINE PROTECTION SWITCHING

BACKGROUND OF THE INVENTION

1. Field of the Invention

The present invention relates generally to the reliability of optical transmission systems, and more specifically to a system and method permitting the optimization of a number of spare components in an optical transmission system using wavelength division multiplexing (WDM).

2. Related Art

Optical networks, comprising a plurality of optical transmission lines, permit high bandwidth communications, and may be used in telephone systems. High speed data can be modulated on light waves which are transmitted through the optical network. Further bandwidth improvement can be achieved by modulating different electrical data signals on distinct light wave carriers having different frequencies. This technique is known as wavelength division multiplexing (WDM). Optical systems using WDM require optical transmitters and receivers that operate at different light wave frequencies. The optical transmission line, connecting an optical transmitter and receiver, can propagate many light wave signals of different frequencies simultaneously.

Optical transmission lines, transmitters and receivers, however, are prone to failure, which is costly to both system providers and users. Therefore, a fault-tolerant optical network is desirable to minimize system outages.

SUMMARY OF THE INVENTION

In accordance with the present invention, there is provided a system and method of photonic facility and line protection switching facilitating a fault-tolerant optical network. In the present invention, the optical network comprises working and protect facilities, working and protect optical transmission lines, space division switches (SDSs), and digital cross-connect switches (DCCSs). A facility is comprised of one or more optical transmitters and/or receivers.

The SDS is an optical cross-connect switch facilitating routing of optical signals. Minimal ports on an SDS are desirable to reduce SDS cost and complexity. The present invention uses SDSs with a small number of ports. The DCCS is an electrical cross-connect switch facilitating the routing of electrical signals.

The optical transmitters, receivers, and transmission lines have different expected reliabilities. The use of both SDSs and DCCSs permit an optical network to be optimally configured with an appropriate mount of working and protect facilities and optical transmission lines. Hence, assume for example, that optical transmission lines have a higher failure rate than optical transmitters. An optical system could be configured in accordance with the present invention to an appropriate number of protect optical transmission lines in excess of the number of protect optical transmitters. It is an advantage of the present invention that the ratio of facilities to protect facilities is independent of the ratio of optical transmission lines to protect optical transmission lines.

In the event of a component failure in the optical network, the SDSs and DCCSs can respectively re-route optical and electrical signals to replace a failed component such as an optical transmitter, receiver, or transmission line. The present invention comprises a protect, or spare, facility or optical transmission line with which to replace a corresponding failed component. Because the network can replace a failed component with a corresponding protect, or spare, component, the optical network can continue functioning despite the failure.

Further features and advantages of the present invention, as well as the structure and operation of various embodiments of the present invention, are described in detail below with reference to the accompanying drawings.

BRIEF DESCRIPTION OF THE DRAWINGS

The present invention is described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION OF THE EMBODIMENTS

Figure 1:
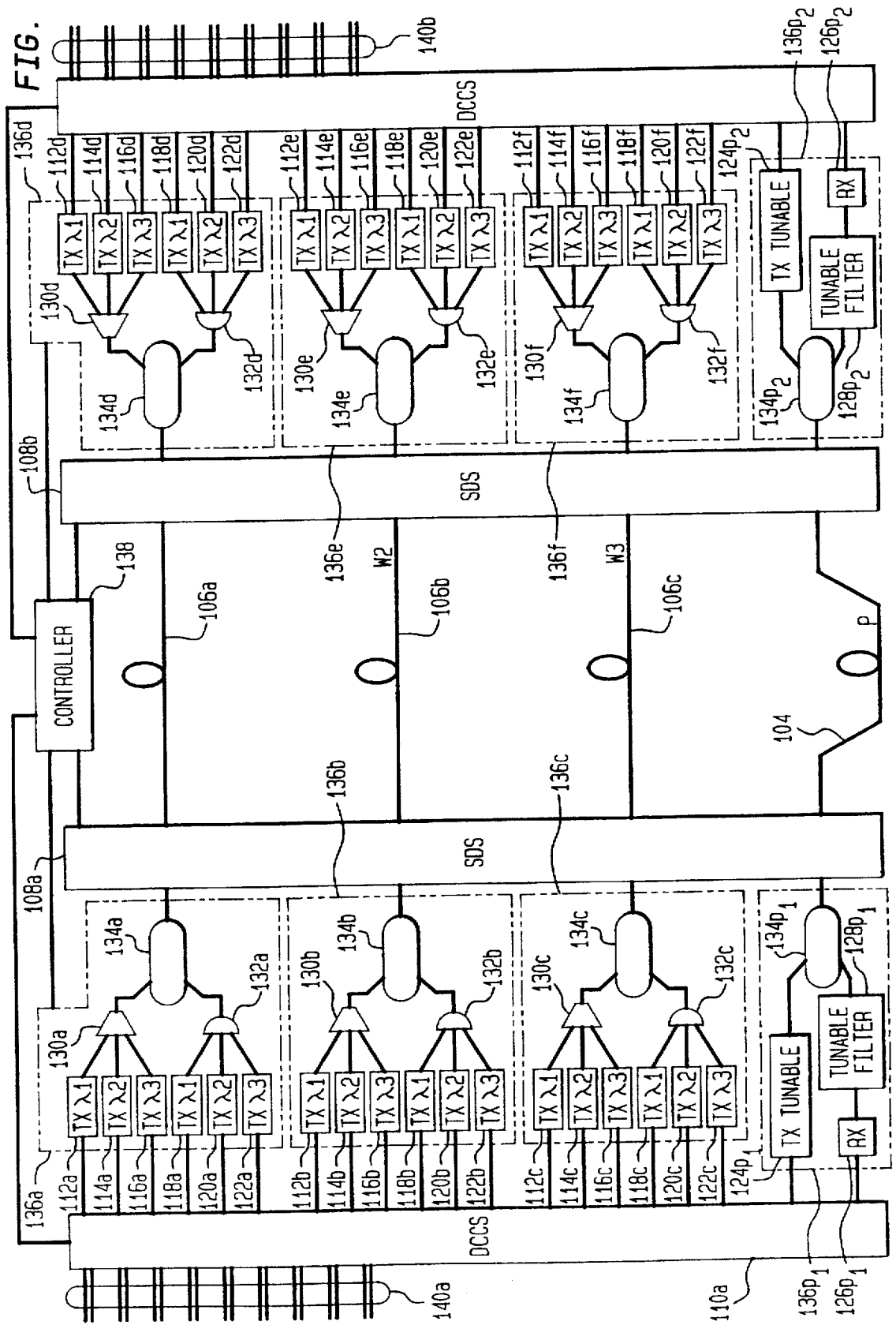
FIG. 1 is a block diagram of one embodiment of an optical network with photonic facility and line protection.

The present invention is directed towards facilitating a fault tolerant optical network. This goal is achieved with photonic line protection using protect, or spare, optical components, such as facilities and optical transmission lines. The topology of the optical network permits use of space division switches (SDSs) with few ports, reducing SDS cost and complexity. FIG. 1 illustrates one embodiment of an optical network 100 with a protect optical transmission line 104 and protect facilities $136p_1$ and $136p_2$. However, the present invention contemplates that the optical network 100 may include more than one protect optical transmission line 104 or two protect facilities $136p_1$ and $136p_2$. In a preferred embodiment, the protect facilities $136p_1$ and $136p_2$ comprise protect optical transmitters $124p_1$ and $124p_2$, protect optical receivers $126p_1$ and $126p_2$ and tunable filters $128p_1$ and $128p_2$.

The optical network 100 comprises two digital cross-connect switches DCCSs) 110a,b. Electrical signals, which may be in a STS-1 or DSC-3 format, are coupled into and out of ports 140a,b of DCCSs 110a,b. The DCCSs 110a,b are coupled to facilities 136a–f. In the preferred embodiment, the facilities 136a–f include optical transmitters 112a–f; 114a–f; 116a–f, optical receivers 118a–f, 120a–f, 122a–f, splitters 132a–f, combiners 130a–f, and three port devices 134a–f. However, alternative embodiments of the facilities 136a–f are contemplated. Optical network 100 further includes a pair of space division switches (SDSs) and optical transmission lines 106a–c.

The embodiment illustrated in FIG. 1 is specifically implemented in an optical network using wave division multiplexing (WDM). Hence, certain components of the optical network 100 are broadband, including the three port devices 134a–f, $134p_1$ and $134p_2$, combiners 130a–f, $130p_1$ and $130p_2$, and splitters 132a–f; $132p_1$ and $132p_2$. The protect transmitter $124p_1$ and $124p_2$ has a tunable carrier frequency and the protect optical receiver $126p_1$ and $126p_2$ can selectively detect light wave signals of varying carrier frequency by changing the passband frequency of a tunable filter $128p_1$ and $128p_2$ coupled to the protect optical receiver $126p_1$ and $126p_2$. In the preferred embodiment, the tunable filters 128$p_1$ and 128$p_2$ are implemented with Fabry-Perot filters. However, alternative embodiments of the tunable filters 128$p_1$ and 128$p_2$ are contemplated.

The electrical signals are routed by the DCCSs 110a,b to or from optical transmitters 112a–f, 114a–f; 116a–f or receivers 118a–f, 120a–f, 122a–f, respectively, as designated by a controller 138. Distinct electrical signals entering optical network 100 are modulated onto light wave carriers having different frequencies (e.g., frequencies corresponding to wavelengths $\lambda_1$, $\lambda_2$, and $\lambda_3$) by the optical transmitters 112a–f, 114a–f, 116a–f. In a preferred embodiment, optical transmitters 112a–f, 114a–f, 116a–f include a laser. However it is contemplated that optical transmitters may comprise an alternative light source. For the sake of clarity, only facilities 136a and 136d will be referred to for the remainder of this discussion.

In one facility 136a, the outputs of the optical transmitters 112a, 114a, 116a having different output carrier frequencies are unified in a combiner 130a which is then connected to a three port device 134a. The three port device 134a permits bidirectional light wave signals to be coupled into and out of separate ports. In the preferred embodiment, the three port device 134a may be comprised of a directional coupler, such as those made with fused optical fibers. However other embodiments of the three port device 134a are contemplated. The three port device 134a is connected to the SDS 108a.

Under normal conditions, SDS 108a routes the combination of modulated light wave signals having different carrier frequencies into the optical transmission line 106a. In the preferred embodiment, the optical transmission line 106a includes bidirectional optical fibers and amplifiers. However, it is contemplated that the optical transmission line 106a comprises only unidirectional optical fibers and amplifiers. Alternatively, the optical transmission line 106a could comprise optical fiber exclusively. The other end of the optical transmission line 106a is coupled to another SDS 108b which routes the light wave signals to another facility 136d and its corresponding three port device 134d.

The light wave signals then propagate from the three port device 134d to a splitter 132d. In a preferred embodiment, the splitter 132d includes a WDM multiplexer (not shown) which has frequency selective outputs corresponding to the carrier frequencies comprising the light wave signal. The WDM multiplexer is typically formed by an optical grating that spatially separates light of different wavelengths.

Alternatively, the splitter 132d may comprise a n-way power divider. Wavelength selectivity can be attained with the n-way power divider by inserting filters between the n-way power dividers and the optical receivers 118d, 120d, 122d. However filters are not needed if the optical receivers 118d, 120d, 122d are frequency selective.

Each output of the splitter 132d is coupled to an optical receiver 118d, 120d, 122d. In the preferred embodiment, the optical receivers 118d, 120d, 122d includes standard optical detectors. However, it is contemplated that alternative optical receiver 118d, 120d, 122d embodiments may be used. The optical receiver 118d, 120d, 122d demodulates an electrical signal from the light wave signal of corresponding carrier frequency. The electrical signal is coupled through a second DCCS 110b to one of its ports 140b.

A controller 138 is connected to components, such as the optical transmitters 112, 114, 116 and receivers 118, 120, 122, in the optical network 100. The controller 138 senses whether the optical network components are functioning properly. In a preferred embodiment, the controller 138 is a processor and can be easily implemented to provide the functionality described herein as would be apparent to one skilled in the art. Alternatively, the controller 138 can comprise a plurality of distributed processors that are coordinated by a communications link (not shown). If a component fails, the controller 138 re-routes the signals passing through the failed component to a protect, or spare, component, utilizing the switching capabilities of the SDSs 108a,b and DCCSs 110a,b. Spare components include a protect optical transmission line 104, a protect optical receiver 126$p_1$ and 126$p_2$ with a tunable filter 128$p_1$ and 128$p_2$, and/or a protect optical transmitter 124$p_1$ and 124$p_2$.

Figure 2:
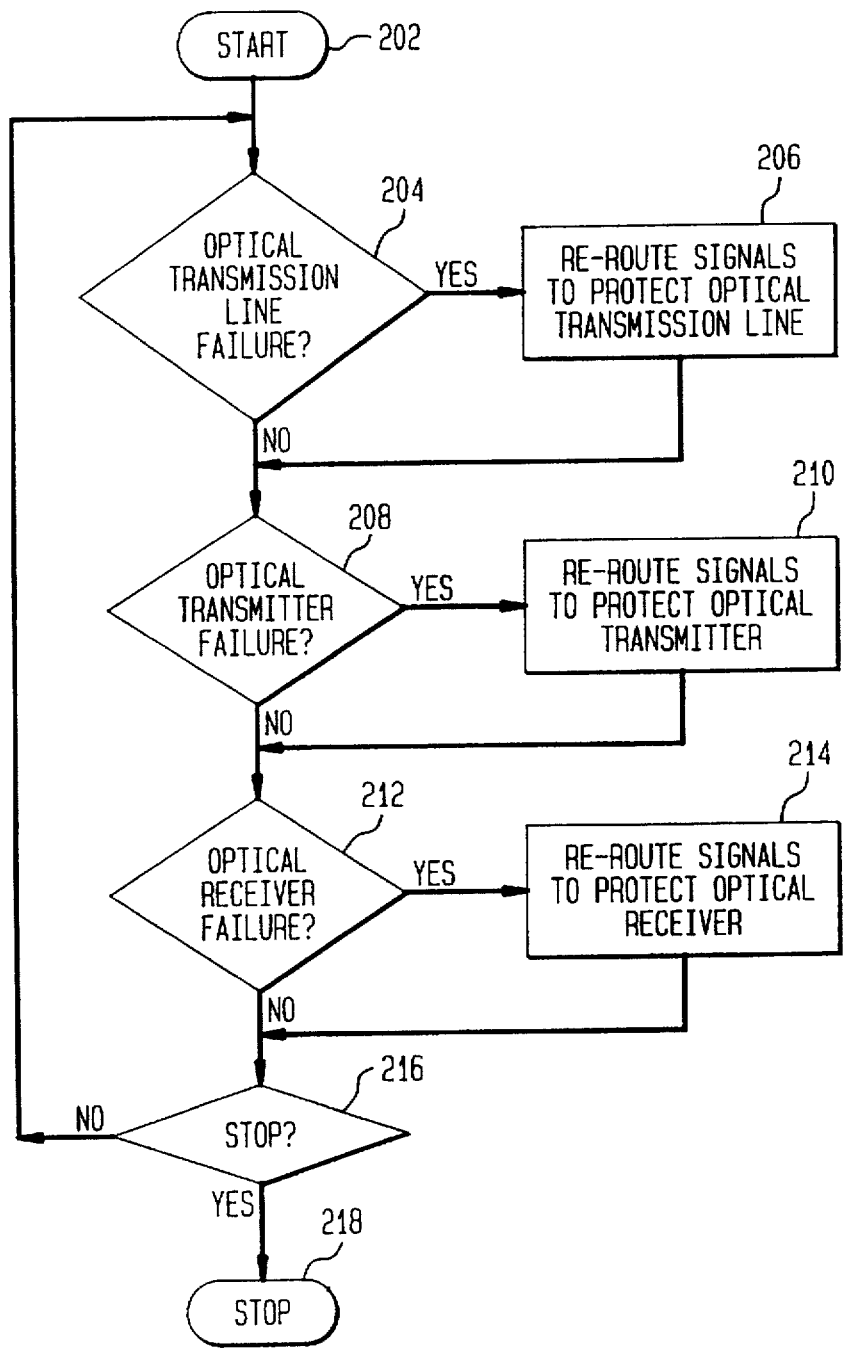
FIG. 2 is a flow chart of the operation of one embodiment of an optical network with photonic facility and line protection.

FIG. 2 illustrates a flow chart of exemplary operation of the fault tolerant nature of the optical network 100. The functionality described below is implemented by controller 138. When optical network 100 commences operation, or alternatively when the optical network first detects a component fault, (step 202), the controller 138 evaluates whether any of the optical transmission lines 106a–c have failed (step 204). One way for the optical network 100 to determine optical transmission line 106a–c failure is for the controller 138 to monitor the lack of reception of light wave signals by all optical receivers 118a–f, 120a–f, 122a–f connected to a specific optical transmission line 106a–c.

If the controller 138 determines that an optical transmission line 106a–c has failed, the controller 138 commands a corresponding SDS 108a,b to re-route the optical signals to an available protect, or spare, optical transmission line 104 (step 206). While a protect optical transmission line 104 is utilized, it is unavailable for further use.

Upon replacing a failed optical transmission line or if none was found, the controller 138 evaluates whether any optical transmitters 112a–f, 114a–f, 116a–f have failed (step 208). If the controller 138 determines an optical transmitter 112a–f; 114a–f; 116a–f has failed, the controller 138 commands the corresponding DCCS 110a,b to re-route the electrical signals from the failed optical transmitter to a protect, or spare, optical transmitter 124$p_1$ and 124$p_2$ (step 210). At about the same time, the protect optical transmitter 124$p_1$ and 124$p_2$ is tuned to the wavelength corresponding to the failed optical transmitter as directed by controller 138. The re-routed electrical signal is modulated on a light wave carrier by the protect optical transmitter 124$p_1$ and 124$p_2$. The resulting modulated light wave signal is then coupled through some of the same components, including the optical transmission line 106a–c and the optical receiver 118a–f, 120a–f, 122a–f, that the original light wave signal had propagated through before the optical transmitter 112a–f, 114a–f; 116a–f failure.

Finally, upon replacing a failed optical transmitter, or if none was found, the controller 138 will determine if any optical receivers 118a–f, 120a–f, 122a–f have failed (step 212). If the controller 138 determines an optical receiver 118a–f; 120a–f, 122a–f has failed, then the controller 138 commands the corresponding SDS 108a,b to re-route the light wave signal from the failed optical receiver to a protect, or spare, optical receiver 126$p_1$ and 126$p_2$ (step 214).

One example of how the controller 138 may determine that an optical receiver 118a–f, 120a–f, 122a–f has failed is now described. The optical receiver 118a–f, 120a–f, 122a–f presents to controller 138 a signal indicating that optical receiver 118a–f, 120a–f, 122a–f has detected a light wave signal. If the optical receiver 118a–f; 120a–f, 122a–f does not present such a signal, and the controller 138 determines that there is no corresponding optical transmission line 106a–c failure, then the controller 138 will conclude that the optical receiver 118a–f, 120a–f, 122a–f has failed.

At about the same time the controller 138 commands the SDS 108a,b to re-route the light wave signal, the controller 138 regulates the protect optical receiver 126$p_{1,2}$ operating frequency by setting the passband of the corresponding tunable filter 128$p_{1,2}$. The detected electrical signal is re-routed by a DCCS 110a,b to the same port 140a,b that the demodulated electrical signal exited before the optical receiver 118a–f, 120a–f, 122a–f failure.

If operation of the controller 138 is halted, the aforementioned process will be stopped (step 218). Otherwise the process will repeat itself, again analyzing if an optical transmission line 106a–c failure has occurred (step 204).

Note, however, that some of the steps described above could be implemented in another order or in parallel. Such an implementation would be apparent to one skilled in the art.

It should be understood that embodiments of the present invention can be implemented in hardware, software or a combination thereof. In such embodiment, the various components and steps would be implemented in hardware and/or software to perform the functions of the present invention. Any presently available or future developed computer software language and/or hardware components can be employed in such embodiments of the present invention. In particular, the flow chart discussed above can be especially useful for creating the software embodiments.

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. An optical network comprising:

an optical transmission line;

a space division switch coupled to said optical transmission line;

a protect optical transmission line coupled to said space division switch;

an optical transmitter coupled to said space division switch;

an optical receiver coupled to said spaced division switch;

a controller coupled to said space division switch, said optical transmitter, and said optical receiver, wherein said controller routes optical signals through said space division switch to said protect optical transmission line when said controller determines that said optical transmission line has failed;

a digital cross-connect switch coupled to said optical transmitter and said optical receiver; and a protect optical transmitter coupled to said space division switch and said digital cross-connect switch, wherein said controller routes electrical input signals through said digital cross-connect switch to said protect optical transmitter when said controller determines that said optical transmitter has failed.

2. The optical network of claim 1 comprising:

a protect optical receiver coupled to said space division switch and said digital cross-connect switch, wherein said controller routes electrical output signals through said digital cross-connect switch to said protect optical receiver when said controller determines that said optical receiver has failed.

3. An optical network comprising:

an optical transmission line;

a space division switch coupled to said optical transmission line;

a protect optical transmission line coupled to said space division switch;

an optical transmitter coupled to said space division switch;

an optical receiver coupled to said spaced division switch;

a controller coupled to said space division switch, said optical transmitter, and said optical receiver, wherein said controller routes optical signals through said space division switch to said protect optical transmission line when said controller determines that said optical transmission line has failed;

a digital cross-connect switch coupled to said optical transmitter and said optical receiver; and a protect optical receiver coupled to said space division switch and said digital cross-connect switch, wherein said controller routes electrical output signals through said digital cross-connect switch to said protect optical receiver when said controller determines that said optical receiver has failed.

4. A method of operating a fault tolerant optical network comprising the steps of:

(1) determining if an optical transmission line has failed;

(2) replacing said optical transmission line with a protect optical transmission line through a space division switch if said optical transmission line has failed;

(3) determining if an optical receiver has failed;

(4) replacing said optical receiver with a protect optical receiver through a digital cross-connect switch if said optical receiver has failed; and (5) tuning said protect optical receiver to a wavelength corresponding to said failed optical receiver.

5. The method of operating a fault tolerant optical network of claim 4 further comprising the steps of:

(6) determining if an optical transmitter has failed;

(7) replacing said optical transmitter with a protect optical transmitter through a digital cross-connect switch if said optical transmitter has failed; and (8) tuning said protect optical transmitter to a wavelength corresponding to said failed optical transmitter.

6. A method of operating a fault tolerant optical network comprising the steps of:

(1) determining if an optical transmission line has failed;

(2) replacing said optical transmission line with a protect optical transmission line through a space division switch if said optical transmission line has failed;

(3) determining if an optical transmitter has failed;

(4) replacing said optical transmitter with a protect optical transmitter through a digital cross-connect switch if said optical transmitter has failed; and (5) tuning said protect optical transmitter to a wavelength corresponding to said failed optical transmitter.

7. An optical network comprising:

a digital cross-connect switch;

a facility coupled to said digital cross-connect switch;

a protect facility coupled to said digital cross-connect switch;

a space division switch coupled to said facility and said protect facility;

an optical transmission line coupled to said space division switch;

a protect optical transmission line coupled to said space division switch; and a controller coupled to said digital cross-connect switch, said facility, said protect facility, and said space division switch.

8. The optical network of claim 7 wherein said facility comprises:

an optical transmitter;

a combiner coupled to said optical transmitter;

an optical receiver;

a splitter coupled to said optical receiver; and a three port device coupled to said combiner and said splitter.

9. The optical network of claim 8 wherein said protect facility comprises:

a protect optical transmitter;

a protect optical receiver;

a tunable filter coupled to said protect optical receiver; and a three port device coupled to said protect optical transmitter and said tunable filter.

10. The optical network of claim 7 wherein said protect facility comprises:

a protect optical transmitter;

a protect optical receiver;

a tunable filter coupled to said protect optical receiver; and a three port device coupled to said protect optical transmitter and said tunable filter.

\* \* \* \* \*